(12) United States Patent
Seshan et al.

(10) Patent No.: US 11,521,249 B2
(45) Date of Patent: Dec. 6, 2022

(54) AUTO-RECONCILIATION

(71) Applicant: Stripe, Inc., San Francisco, CA (US)

(72) Inventors: Tara Seshan, San Francisco, CA (US); Clinton Carjoel Blackburn, Oakland, CA (US); Victoria Martinez, San Francisco, CA (US)

(73) Assignee: Stripe, Inc., San Francisco, CA (US)

( * ) Notice: Subject to any disclaimer, the term of this patent is extended or adjusted under 35 U.S.C. 154(b) by 91 days.

(21) Appl. No.: 16/795,890

(22) Filed: Feb. 20, 2020

(65) Prior Publication Data

US 2020/0294106 A1 Sep. 17, 2020

Related U.S. Application Data

(60) Provisional application No. 62/817,881, filed on Mar. 13, 2019.

(51) Int. Cl.
| | |
|---|---|
| *G07F 19/00* | (2006.01) |
| *H04M 15/00* | (2006.01) |
| *G07B 17/00* | (2006.01) |
| *G06Q 40/00* | (2012.01) |
| *G06Q 30/04* | (2012.01) |
| *G06Q 20/38* | (2012.01) |
| *G06Q 40/02* | (2012.01) |
| *G06N 5/04* | (2006.01) |
| *G06Q 10/10* | (2012.01) |
| *G06N 20/00* | (2019.01) |
| *G06Q 20/04* | (2012.01) |

(52) U.S. Cl.
CPC ............... *G06Q 30/04* (2013.01); *G06N 5/04* (2013.01); *G06N 20/00* (2019.01); *G06Q 10/10* (2013.01); *G06Q 20/042* (2013.01); *G06Q 20/385* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 2005/0075979 A1* | 4/2005 | Leavitt | G06Q 30/04 |
| | | | 705/40 |
| 2014/0337188 A1* | 11/2014 | Bennett | G06Q 20/102 |
| | | | 705/30 |
| 2019/0392428 A1* | 12/2019 | Bolla | H04L 63/08 |

FOREIGN PATENT DOCUMENTS

| | | | | |
|---|---|---|---|---|
| JP | 4724335 B2 * | 7/2011 | | |
| WO | WO-2017011596 A1 * | 1/2017 | ........... | G06Q 20/023 |
| WO | WO-2018106934 A1 * | 6/2018 | ........... | G06Q 20/102 |

* cited by examiner

*Primary Examiner* — Ariel J Yu

(74) *Attorney, Agent, or Firm* — Schwegman Lundberg & Woessner, P.A.

(57) ABSTRACT

In an example embodiment, a payment processor automatically generates a virtual account number that can be used by customers to perform push payments, such as ACH, wire transfer, and direct deposits. This virtual account number may be surfaced to customers via invoices sent by service or product providers. The payment processor is then able to automatically match the payment sent to the virtual account number and the amount owed on the invoice.

20 Claims, 7 Drawing Sheets

US 11,521,249 B2

AUTO-RECONCILIATION

CROSS-REFERENCE TO RELATED APPLICATION

This application is a Non-Provisional of and claims the benefit of priority under 35 U.S.C. § 119(e) from U.S. Provisional Application Ser. No. 62/817,881, entitled "AUTO-RECONCILIATION," filed on Mar. 13, 2019 which is hereby incorporated by reference herein in its entirety.

TECHNICAL FIELD

The subject matter disclosed herein generally relates to the technical field of special-purpose machines programmed with a machine-learned model that facilitate adding new features to a reconciliation.

BACKGROUND

The present subject matter seeks to address technical problems existing in conventional payment processors. For example, while payment processors seek to provide merchants with an easy and efficient mechanism for collecting payments from customers, collecting such payments may encounter difficulties for various reasons. One such difficulty involves payments that are initiated from the payer-side with no need for interaction from the payee-side. Such payments are often called "Push" payments, as the payer is essentially "pushing" the payment to the payee. Examples of push payments are wire transfers, Automated Clearing House (ACH) transfers, and direct deposits.

One technical problem encountered when push payments are sent to companies or other large entities that have many potential payees is reconciliation. Specifically, it can be challenging to match up these push payments with specific invoices or payers. Typically, there is a "memo" field available for payers to identify themselves and/or invoice numbers of the invoices they are paying, but this, and other similar fields, are often misused or simply unused by payers, resulting in a time-consuming and difficult process for the payee to match up particular push payments with particular invoices.

BRIEF DESCRIPTION OF THE DRAWINGS

Some embodiments are illustrated by way of example and not limitation in the figures of the accompanying drawings. In order to identify more easily the discussion of any particular element or act, the most significant digit or digits in a reference number refer to the figure number in which that element is first introduced.

DETAILED DESCRIPTION

In some embodiments, a JavaScript library can be wired into a merchant's invoicing system. This JavaScript library may contain scripts to automatically generate a different virtual account number for each payer (e.g., each unique recipient of a generated invoice). The virtual account number for a payer may be included in invoices sent to the payer.

In some embodiments, the JavaScript library may additionally include automatic reconciliation scripts that acts to automatically reconcile payments made to the virtual account numbers with corresponding open invoices within the merchant's invoicing system.

Figure 1:
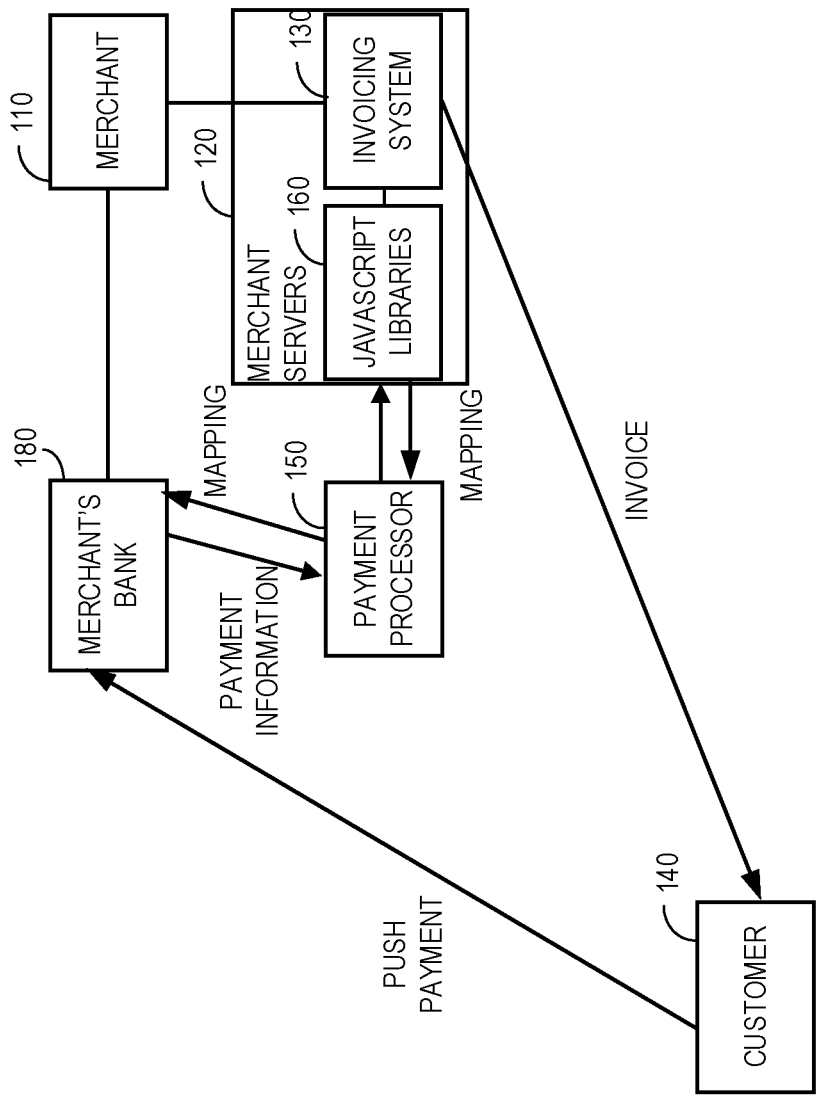
FIG. 1 is a block diagram showing aspects of a payment flow, according to an example embodiment.

Viewed broadly in one example, and with reference to FIG. 1 a payment processing flow is now described. A merchant 110 may maintain one or more merchant servers 120. The merchant servers 120 may include an invoicing system 130 used to generate invoices for purchases and send the invoices to customers, such as customer 140.

In an example embodiment, a payment processor 150 may distribute one or more JavaScript libraries 160 to the merchant servers 120. These JavaScript libraries 160 may interface with the invoicing system 130 such that, when needed, a virtual account number for customer 140 is generated. "When needed" may be, for example, the first time an invoice for a particular customer is generated. For subsequent invoices for the same customer, the previously-generated virtual account number may be used. The JavaScript libraries may also act to place the generated virtual account number into invoices generated for the customer. As the invoices are generated, they may be sent to the customer 140 for payment.

The payment processor 150 may have previously established a mechanism/protocol for generating the virtual account numbers with the merchant's bank. In some example embodiments, the merchant's bank may have specified the mechanism/protocol for generating the virtual account numbers so as not to conflict with its own internal mechanism/protocol for generating non-virtual account numbers. This might include, for example, a numbering scheme (e.g., the account numbers are all 10 digits formatted as five digits then a hyphen and then an additional five digits). This might also include, for example, some restrictions or requirements on the numbering scheme (e.g., only account numbers beginning with 95 can be generated, no account numbers beginning with 0 can be generated, etc.). The payment processor 550 can include this mechanism/protocol for generating virtual account numbers in accordance with these requirements/restrictions in the JavaScript libraries.

Additionally, the JavaScript libraries 160 may generate a mapping between virtual account numbers and the merchant. This virtual account number-merchant mapping may be passed to the payment processor 150 and can be used later for the payment processor 150 to automatically reconcile payments with the invoices.

Furthermore, the payment processor 150 can create an additional mapping between the virtual account numbers for all the merchants that it has passed JavaScript libraries to and pass this additional mapping to the merchant's bank 180. This way the merchant's bank 180 is able to provide information about the deposits to these virtual account numbers without violating the security/privacy of other bank customers.

The customer 140, having received a generated invoice, may act to pay part or all of the invoice via a push payment to the merchant's bank 180. This push payment is received and processed by the merchant's bank 180 and credited to the corresponding virtual account number. The payment processor 150 may then receive information about the payment, which can be used for automatic reconciliation of invoices. Alternatively, the payment processor 150 may forward the payment information to the JavaScript libraries 160 at the corresponding merchant servers 120 of the merchant 110 to perform the automatic reconciliation.

The use of the virtual account number aids in the automatic reconciliation process, regardless of which component is performing this function.

The automatic reconciliation process will now be described. Once a payment is made, the payment may be matched to an invoice by attempting to first fulfill the oldest outstanding invoice of the same payment amount attributable to the virtual account number. If no such match is made (i.e., if the payment amount does not match any outstanding invoice amount), then the automatic reconciliation process moves towards exception handling. In exception handling, four different cases are examined: overpayment, underpayment, botched installment payment, and check-specific. In the overpayment case, the payment is assigned to the closest matching invoice (e.g., the invoice with the closest amount owed to the payment), and the difference between the amount owed on the invoice and the payment amount is provided as a customer credit for future invoices.

In the underpayment case, there are actually two types of underpayment—accidental and intentional. In accidental underpayment, the payer meant to pay the correct amount but instead paid less. Often this can occur if a middleman entity (e.g., bank, government) levies a fee that the payer did not anticipate. A forgiveness threshold may be used in such cases to determine whether to simply forgive the difference between the paid amount and the owed amount or to continue to attempt to collect (e.g., generate a revised invoice for the difference). This forgiveness threshold may either be preset or dynamically determined. It may also be an absolute threshold (e.g., a particular dollar amount) or a relative threshold (e.g., a percentage of the overall owed amount).

When the forgiveness threshold is dynamically set, a machine learned model (a software model having parameters that a learned via a machine learning algorithm based on input features) may be used. Input features to the machine learning algorithm and machine learned model may include customer information (e.g., location, size, etc.), payment history, and merchant information (e.g., location, size, etc.). In the preset case, each merchant may set a different forgiveness threshold.

In intentional underpayment, the customer deliberately underpays an invoice. One possible reason for this is they may have negotiated an installment plan for payment. The system may also look at past payments to investigate the possibility of fraud (intentional underpayment in an attempt to fool the system into accepting less than what is owed).

In the botched installment case, the merchant intended the payment plan to be set up as an installment plan, but accidentally generated a single invoice for the entire payment. Here, the merchant can be alerted to the issue and can then choose to void the invoice and generate a new one or to credit any overpayment to the customer's account.

In the check-specific case, a payment was received but no invoice number was included. In this case, the merchant to which the payment should be credited can be identified (from the Virtual Bank Account Number (VBAN)), but the customer cannot. In this case, information about the payment may be placed in a reconciliation queue accessible to the merchant. The merchant may then, from time to time, access the reconciliation queue and attempt to reconcile the payments identified in it.

Another potential technique issue is that with certain banking partners and certain countries, the total set of VBANs available may be small. Additionally, a rate limit (the number of VBANs available to issue per day) may also be small. In order to solve these problems, VBANs may be recycled. Recycling involves disconnecting the recycled VBAN from the merchant to which it was assigned, allowing it to then be connected to a different merchant. Determining whether a VBAN is a candidate for recycling can be a challenging technical problem. In one example embodiment, VBANs that were generated for single payments only are candidates to be recycled. In another example embodiment, VBANs that were used on at least one invoice but not used by the corresponding customer to pay those invoices are also candidates to be recycled.

Figure 2:
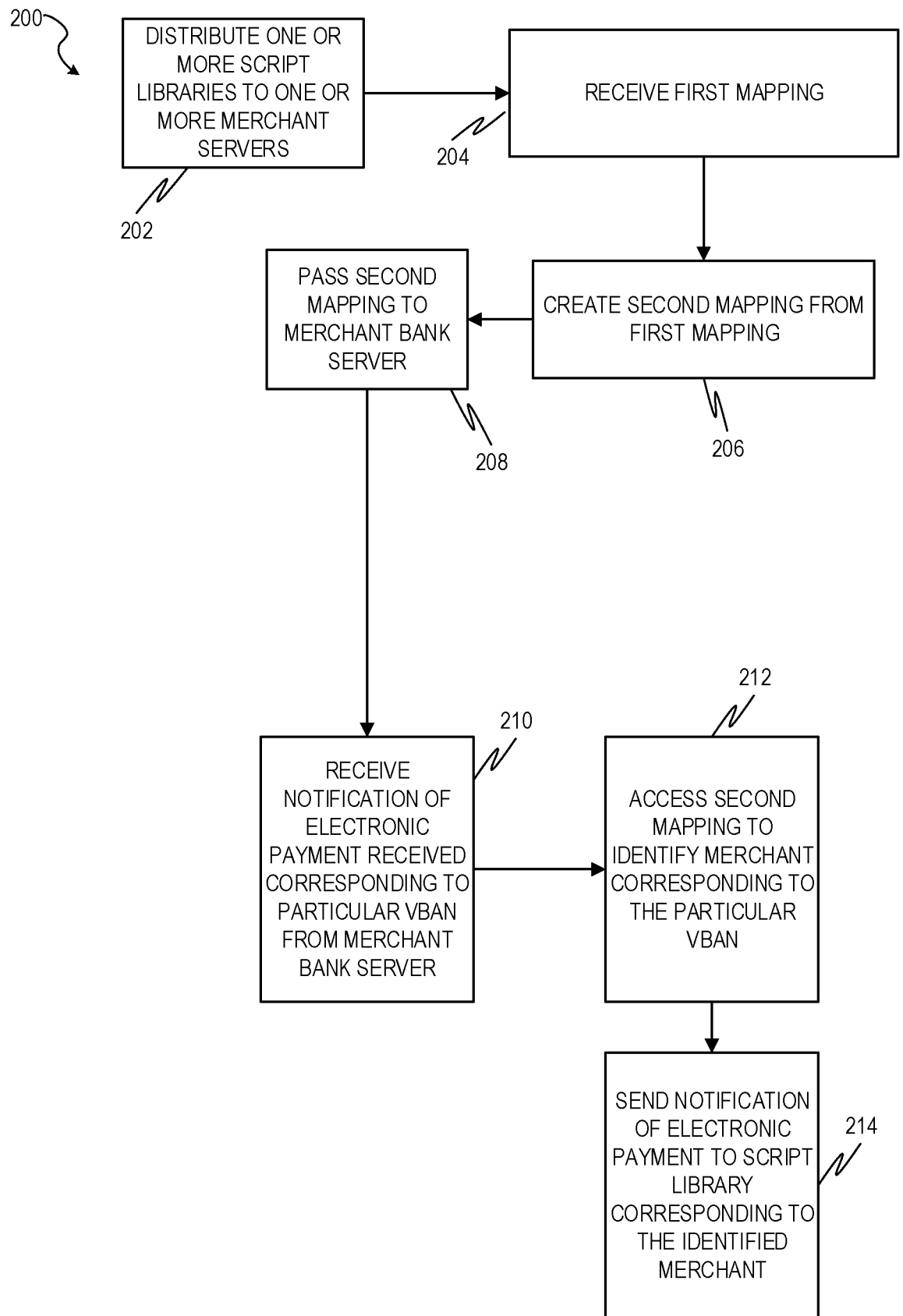
FIG. 2 is a flow diagram illustrating a method for automatically reconciling information included with an electronic payment with an invoice data structure, in accordance with an example embodiment.

FIG. 2 is a flow diagram illustrating a method 200, for automatically reconciling information included with an electronic payment with an invoice data structure, in accordance with an example embodiment. At operation 202, one or more script libraries are distributed to one or more merchant servers, the one or more script libraries containing script to, upon a first time an invoice is generated for a customer, automatically generate a VBAN uniquely corresponding to the customer and to automatically insert the VBAN in the invoice and subsequent invoices for the customer, the generated VBAN corresponding to a merchant bank associated with a merchant operating the merchant servers.

At operation 204, a first mapping between one or more VBANs and the merchant is received from the one or more script libraries. At operation 206, a second mapping between a plurality of merchants and corresponding VBANs generated for the merchant is created from the first mapping between the one or more VBANs and the merchant. At operation 208, the created second mapping is passed to a merchant bank server.

At operation 210, a notification of an electronic payment received corresponding to a particular VBAN is received from the merchant bank server. At operation 212, the second mapping is accessed to identify the merchant corresponding to the particular VBAN. At operation 214, the notification of the electronic payment is sent to a script library corresponding to the identified merchant, causing the script library to automatically reconcile the electronic payment with a particular invoice.

Figure 3:
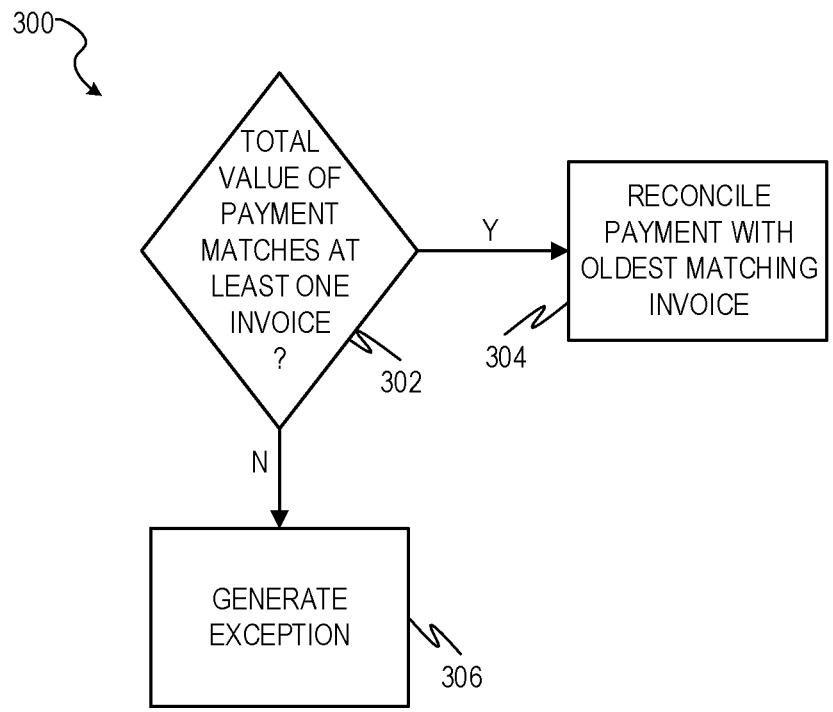
FIG. 3 is a flow diagram illustrating a method for automatic reconciliation, in accordance with an example embodiment.

FIG. 3 is a flow diagram illustrating a method 300, for automatic reconciliation, in accordance with an example embodiment. At operation 302, it is determined if the total value of the electronic payment matches an invoice associated with a customer associated with the particular VBAN. If so, then at operation 304, the electronic payment is reconciled with an oldest matching invoice. If not, then at operation 306, an exception is generated.

"Carrier Signal" in this context refers to any intangible medium that is capable of storing, encoding, or carrying instructions for execution by the machine, and includes digital or analog communication signals or other intangible media to facilitate communication of such instructions. Instructions may be transmitted or received over the network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronics, game console, set-top box, or any other communication device that a user may use to access a network.

"Customer's Electronic Device" or "Electronic User Device" in this context refers to a client device that the customer uses to interact with the merchant. Examples of this device include a desktop computer, a laptop computer, a mobile device (e.g., smartphone, tablet), and a game console. The customer's electronic device may interact with the merchant via a browser application that executes on the device or via a native app installed onto the customer's device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"Component" in this context refers to a device, physical entity, or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device or other tangible media able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

In another context, a "Processor," also referred to herein as "processor (540 in FIG. 5)," is a company (often a third party) appointed to handle payment card transactions (e.g., credit card, debit card). They have connections to various card networks and supply authorization and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB®, and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" in this context refers to a bank that offers card network or association branded payment cards directly to consumers. An issuing bank assumes primary liability for the consumer's capacity to pay off debts they incur with their card.

"Payment Information" includes information required to complete a transaction, and the specific type of information provided may vary by payment type. Some payment information will be sensitive (e.g., the card validation code) while other information might not be (e.g., zip code). For example, when making payment via a credit card or debit card, the payment information includes a primary account number (PAN) or credit card number, card validation code, and expiration month and year. In another payment example, made using an ACH transaction for example, the payment information includes a bank routing number and an account number within that bank.

"Sensitive information" may not necessarily be related to payment information and may include other confidential personal information, such as medical (HIPAA) information, for example. The ambit of the term "Payment Information" includes "Sensitive Information" within its scope. In some examples, sensitive payment information may include "regulated payment information," which may change over time. For example, currently a merchant cannot collect more than the first six (6) or the last four (4) numbers of a customer's PAN without generally needing to comply with Payment Card Industry (PCI) regulations. But card lengths may change, and when they do, the "6 and 4" rules will likely change with them. These potential future changes are incorporated within the ambit of "regulated payment information," which is, in turn, included within the ambit of the term "payment information" as defined herein.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor and sometimes act as an agent for a direct seller/licensor.

"Merchant Site" in this context refers to an e-commerce site or portal (e.g., website, or mobile app) of the merchant. In some figures, the merchant 100 and merchant server 120 are associated with the merchant site. The merchant site is associated with a client-side (client side) application and a server-side (server side) application. In one example embodiment, the merchant site includes the Merchant Server (120 in FIG. 1), and the server-side application executes on the Merchant Server (120).

"Native Application" or "native app" in this context refers to an app commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a locally installed application. A native application differs from an interpreted application, such as a Java applet, which requires interpreter software. A native application also differs from an emulated application that is written for a different platform and converted in real time to run, and a Web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings forming a part of this document: Copyright 2011-2018, Stripe, Inc., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In an example embodiment, a payment processor automatically generates a virtual account number that can be used by customers to perform push payments, such as ACH, wire transfer, and direct deposits. This virtual account number may be surfaced to customers via invoices sent by service or product providers. The payment processor is then able to automatically match the payment sent to the virtual account number and the amount owed on the invoice, through various mechanisms that will be described later.

One technical advantage to this solution is that entities issuing invoices to customers do not need to expose sensitive account details to users, thus improving security. Another technical advantage of this solution is that the entities issuing invoices to customers do not need to manually reconcile payments with open invoices.

Reconciliation is performed automatically by matching incoming payments with invoice payments, managing the cases of over or underpayments, minimizing the API calls needed to receive funds paid via a push payment method, and managing dunning and retries of open invoices.

Figure 4:
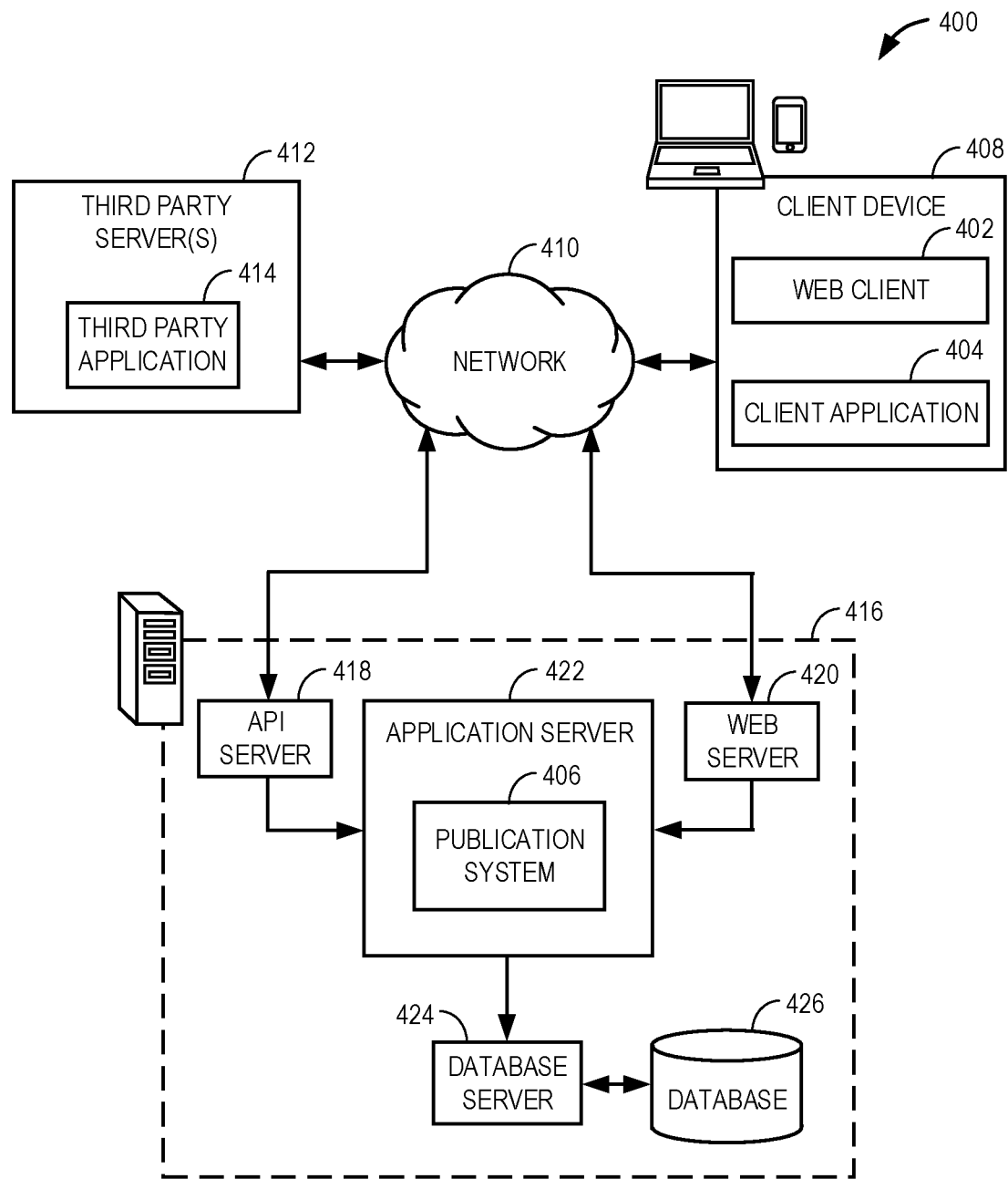
FIG. 4 is a block diagram illustrating a networked system, according to an example embodiment.

With reference to FIG. 4, an example embodiment of a high-level SaaS network architecture 400 is shown. A networked system 416 provides server-side functionality via a network 410 (e.g., the Internet or WAN) to a client device 408. A web client 402 and a programmatic client, in the example form of a client application 404, are hosted and execute on the client device 408. The networked system 416 includes an application server 422, which in turn hosts a publication system 406 (such as the publication system hosted at https://stripe.com by Stripe, Inc. of San Francisco, Calif. (herein "Stripe," as an example of a payment processor)) that provides a number of functions and services to the application 404 that accesses the networked system 416. The application 404 also provides a number of interfaces described herein, which present output of the scheduling operations to a user of the client device 408.

The client device 408 enables a user to access and interact with the networked system 416 and, ultimately, the publication system 406. For instance, the user provides input (e.g., touch screen input or alphanumeric input) to the client device 408, and the input is communicated to the networked system 416 via the network 410. In this instance, the networked system 416, in response to receiving the input from the user, communicates information back to the client device 408 via the network 410 to be presented to the user.

An API server 418 and a web server 420 are coupled, and provide programmatic and web interfaces respectively, to the application server 422. The application server 422 hosts the publication system 406, which includes components or applications described further below. The application server 422 is, in turn, shown to be coupled to a database server 424 that facilitates access to information storage repositories (e.g., a database 426). In an example embodiment, the database 426 includes storage devices that store information accessed and generated by the publication system 406.

Additionally, a third-party application 414, executing on a third-party server(s) 412, is shown as having programmatic access to the networked system 416 via the programmatic interface provided by the API server 418. For example, the third-party application 414, using information retrieved from the networked system 416, may support one or more features or functions on a website hosted by the third party.

Turning now specifically to the applications hosted by the client device 408, the web client 402 may access the various systems (e.g., publication system 406) via the web interface supported by the web server 420. Similarly, the application 404 (e.g., an "app" such as a Payment Processor app) accesses the various services and functions provided by the publication system 406 via the programmatic interface provided by the API server 418. The application 404 may be, for example, an "app" executing on a client device 408, such as an iOS or Android OS application to enable a user to access and input data on the networked system 416 in an off-line manner and to perform batch-mode communications between the programmatic client application 404 and the networked system networked system 416.

Further, while the SaaS network architecture 400 shown in FIG. 4 employs a client-server architecture, the present inventive subject matter is of course not limited to such an architecture, and could equally well find application in a distributed, or peer-to-peer, architecture system, for example. The publication system 406 could also be implemented as a standalone software program, which does not necessarily have networking capabilities.

Figure 5:
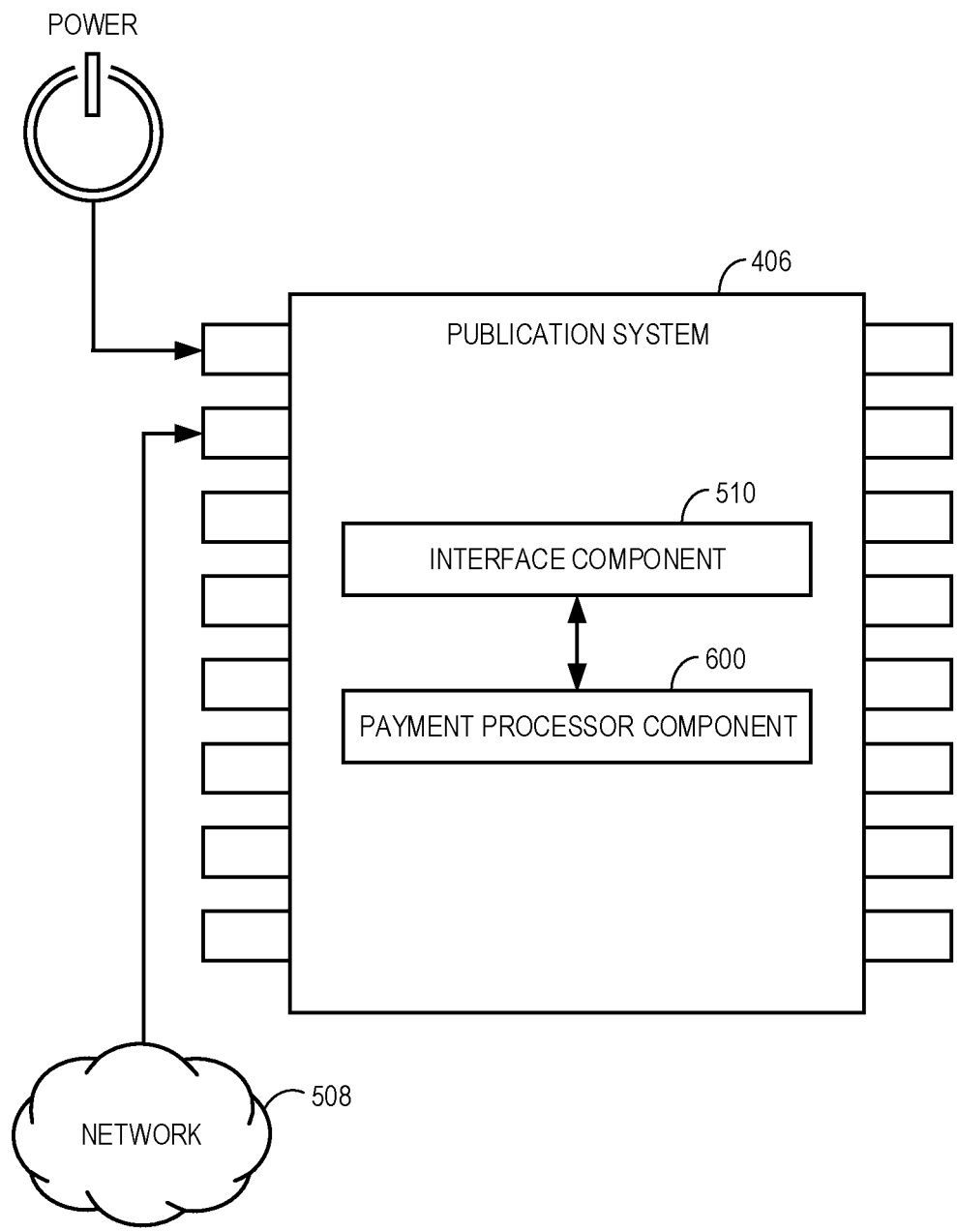
FIG. 5 is a block diagram showing architectural aspects of a networked system, according to some example embodiments.

FIG. 5 is a block diagram showing architectural details of a publication system 406, according to some example embodiments. Specifically, the publication system 406 is shown to include an interface component 510 by which the publication system 406 communicates (e.g., over the network 208) with other systems within the SaaS network architecture 400.

The interface component 510 is communicatively coupled to a payment processor component 600 that operates to provide smart dunning functionality for a payment processor, in accordance with the methods described herein with reference to the accompanying drawings.

Figure 6:
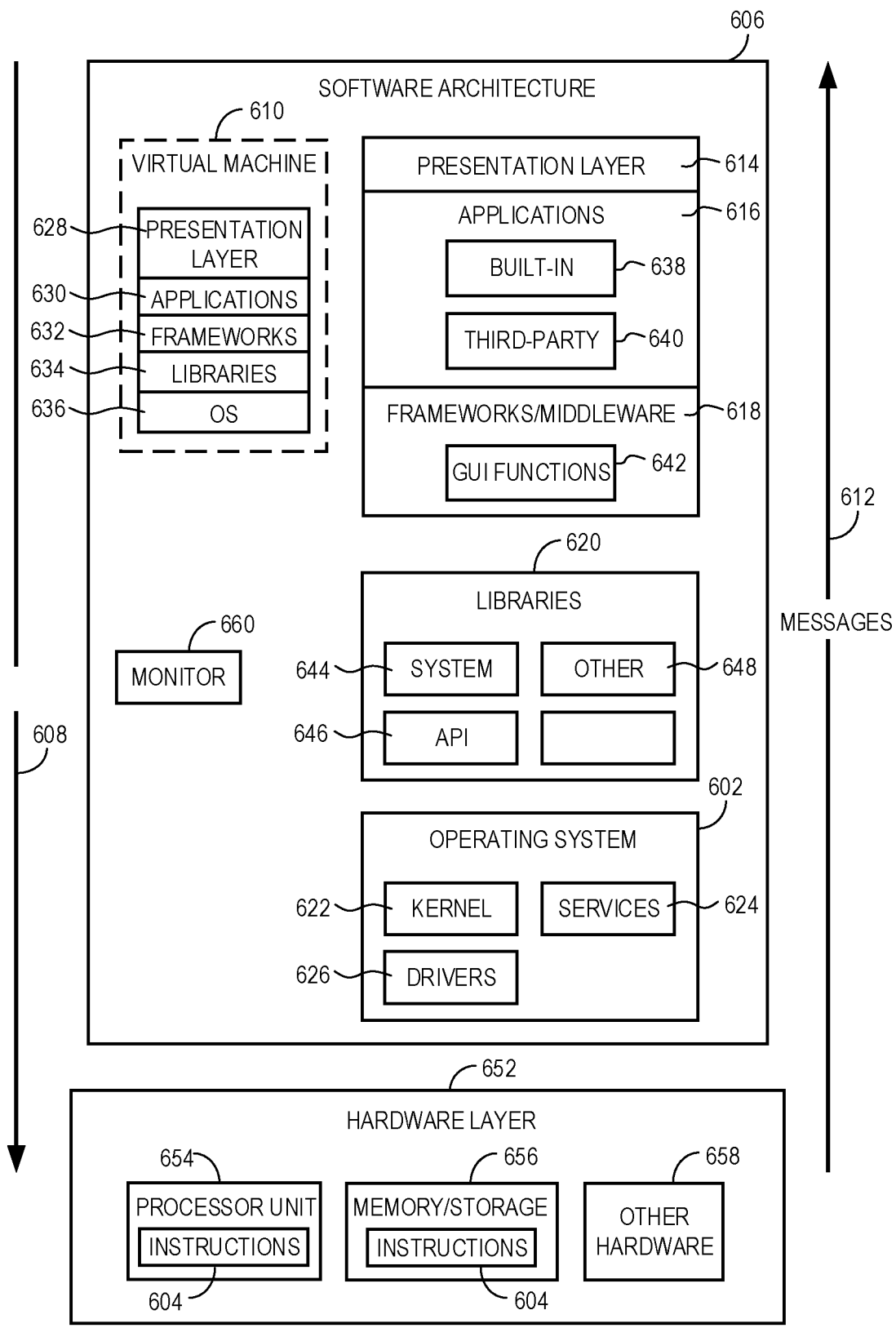
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 400 of FIG. 4 that includes, among other things, processors 404, memory/storage 406, and input/output (I/O) components 418. A representative hardware layer 652 is illustrated and can represent, for example, the machine 400 of FIG. 4. The representative hardware layer 652 includes a processor 654 having associated executable instructions 604. Executable instructions 604 represent the executable instructions of the software architecture 606, including implementation of the methods, components and so forth described herein. The hardware layer 652 also includes memory and/or storage modules as memory/storage 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, applications 616, and a presentation layer 614. Operationally, the applications 616 and/or other components within the layers may invoke API calls 608 through the software stack and receive a response as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphic user interface (GUI) functions 642, high-level resource management, high-level location services, and so forth. The frameworks/middleware 618 may provide a broad spectrum of other APIs that may be utilized by the applications 616 and/or other software components/modules, some of which may be specific to a particular operating system or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include any application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built-in operating system functions (e.g., kernel 622, services 624, and/or drivers 626), libraries 620, and frameworks/middleware 618 to create user interfaces to interact with users of the system. Alternatively, or additionally, in some systems, interactions with a user may occur through a presentation layer, such as presentation layer 614. In these systems, the application/component "logic" can be separated from the aspects of the application/component that interact with a user.

Some software architectures use virtual machines. In the example of FIG. 6, this is illustrated by a virtual machine 610. The virtual machine 610 creates a software environment where applications/components can execute as if they were executing on a hardware machine (such as the machine 400 of FIG. 4, for example). The virtual machine 610 is hosted by a host operating system (operating system (OS) 636 in FIG. 6) and typically, although not always, has a virtual machine monitor 660, which manages the operation of the virtual machine 610 as well as the interface with the host operating system (i.e., operating system 602). A software architecture executes within the virtual machine 610 such as an operating system (OS) 636, libraries 634, frameworks 632, applications 630, and/or presentation layer 628. These layers of software architecture executing within the virtual machine 610 can be the same as corresponding layers previously described or may be different.

Figure 7:
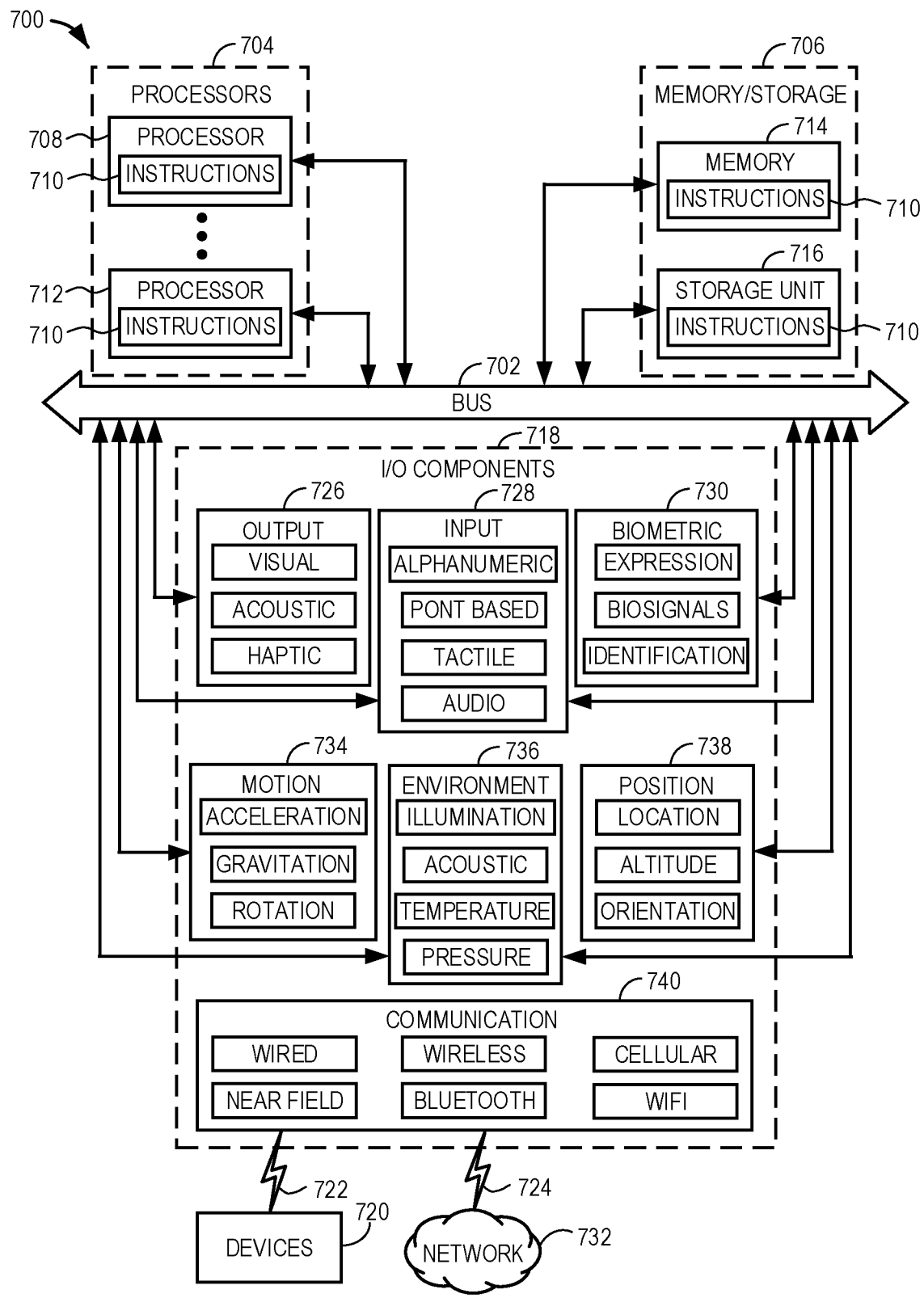
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, 708, 712, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environment components 736, or position components 738, among a wide array of other components. For example, the biometric components 730 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geo-location, location via Wi-Fi® signal triangulation, location via detecting a NFC beacon signal that may indicate a particular location, and so forth.

Some embodiments include machine-readable media including instructions which, when read by a machine, cause the machine to perform the operations of any one or more of the methodologies summarized above, or described elsewhere herein.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, for automatically reconciling information included with an electronic payment with an invoice data structure, the method comprising:
    distributing one or more script libraries to one or more merchant servers, the one or more script libraries configured to detect an indication that an invoice has been generated for a customer for a first time and to, in response to the detection of the indication, automatically generate a virtual bank account number (VBAN), wherein the VBAN uniquely corresponds to both the customer and a merchant bank of a merchant operating the merchant server, and wherein the VBAN generation is configured to generate a new VBAN and associate the new VBAN with the customer and the merchant bank of the merchant and to automatically insert the VBAN in the invoice and subsequent invoices for the customer;
    receiving, from the one or more script libraries, a first mapping between one or more VBANs and the merchant;
    creating, from the first mapping between the one or more VBANs and the merchant, a second mapping between a plurality of merchants and corresponding VBANs generated for the merchant;
    passing the created second mapping to a merchant bank server;
    receiving, from the merchant bank server, a notification of an electronic payment received corresponding to a particular VBAN;
    accessing the second mapping to identify the merchant corresponding to the particular VBAN; and
    sending the notification of the electronic payment to a script library corresponding to the identified merchant, causing the script library to automatically reconcile the electronic payment with a particular invoice.

2. The method of claim 1, wherein the automatic reconciliation comprises:
    determining whether a total value of the electronic payment matches an invoice associated with a customer associated with the particular VBAN; and
    generating an exception if the total value of the electronic payment does not match any invoice associated with a customer associated with the particular VBAN.

3. The method of claim 2, wherein the automatic reconciliation further comprises:
    reconciling the electronic payment with an oldest matching invoice, if the total value of the electronic payment matches at least one invoice associated with a customer associated with the particular VBAN.

4. The method of claim 2, wherein the automatic reconciliation further comprises:
    handling the exception by determining if the electronic payment constitutes an overpayment, underpayment, botched installment payment, or check-specific payment.

5. The method of claim 4, wherein if it is determined that the electronic payment constitutes an underpayment, automatically forgiving a difference between the total value of the electronic payment and a total amount owed on a matching invoice if the difference is within a forgiveness threshold.

6. The method of claim 5, wherein the forgiveness threshold is fixed based on the merchant.

7. The method of claim 5, wherein the forgiveness threshold is dynamically determined.

8. The method of claim 7, wherein the forgiveness threshold is dynamically determined based on output of a machine learned model trained by a machine learning algorithm based on customer information, past customer payment information, and merchant information.

9. The method of claim 1, further comprising recycling one or more VBANs by disassociating the recycled one or more VBANs from customers and merchants.

10. The method of claim 9, wherein the one or more VBANs recycled include VBANs originally assigned for single use.

11. The method of claim 9, wherein the one or more VBANs recycled include VBANs never used for an electronic payment.

12. A system for handling a failed payment attempt in an electronic payment processing system, the system comprising:
    a network;
    one or more hardware processors; and
    a memory storing instructions that, when executed by at least one processor among the processors, cause the system to perform operations comprising, at least:
    distributing one or more script libraries to one or more merchant servers, the one or more script libraries configured to detect an indication that an invoice has been generated for a customer for a first time and to, in response to the detection of the indication, automatically generate a virtual bank account number (VBAN), wherein the VBAN uniquely corresponds to both the customer and a merchant bank of a merchant operating the merchant server, and wherein the VBAN generation is configured to generate a new VBAN and associate the new VBAN with the customer and the merchant bank of the merchant and to automatically insert the VBAN in the invoice and subsequent invoices for the customer;
    receiving, from the one or more script libraries, a first mapping between one or more VBANs and the merchant;
    creating, from the first mapping between the one or more VBANs and the merchant, a second mapping between a plurality of merchants and corresponding VBANs generated for the merchant;
    passing the created second mapping to a merchant bank server;
    receiving, from the merchant bank server, a notification of an electronic payment received corresponding to a particular VBAN;
    accessing the second mapping to identify the merchant corresponding to the particular VBAN; and
    sending the notification of the electronic payment to a script library corresponding to the identified merchant, causing the script library to automatically reconcile the electronic payment with a particular invoice.

13. The system of claim 12, wherein the automatic reconciliation comprises:
    determining whether a total value of the electronic payment matches an invoice associated with a customer associated with the particular VBAN; and
    generating an exception if the total value of the electronic payment does not match any invoice associated with a customer associated with the particular VBAN.

14. The system of claim 13, wherein the automatic reconciliation further comprises:
    reconciling the electronic payment with an oldest matching invoice, if the total value of the electronic payment matches at least one invoice associated with a customer associated with the particular VBAN.

15. The system of claim 13, wherein the automatic reconciliation further comprises:
    handling the exception by determining if the electronic payment constitutes an overpayment, underpayment, botched installment payment, or check-specific payment.

16. A non-transitory machine-readable medium comprising instructions which, when read by a machine, cause the machine to perform operations for handling a failed payment attempt in an electronic payment processing system, the operations comprising:
    distributing one or more script libraries to one or more merchant servers, the one or more script libraries configured to detect an indication that an invoice has been generated for a customer for a first time and to, in response to the detection of the indication, automatically generate a virtual bank account number (VBAN), wherein the VBAN uniquely corresponds to both the customer and a merchant bank of a merchant operating the merchant server, and wherein the VBAN generation is configured to generate a new VBAN and associate the new VBAN with the customer and the merchant bank of the merchant and to automatically insert the VBAN in the invoice and subsequent invoices for the customer;
    receiving, from the one or more script libraries, a first mapping between one or more VBANs and the merchant;
    creating, from the first mapping between the one or more VBANs and the merchant, a second mapping between a plurality of merchants and corresponding VBANs generated for the merchant;
    passing the created second mapping to a merchant bank server;
    receiving, from the merchant bank server, a notification of an electronic payment received corresponding to a particular VBAN;
    accessing the second mapping to identify the merchant corresponding to the particular VBAN; and
    sending the notification of the electronic payment to a script library corresponding to the identified merchant, causing the script library to automatically reconcile the electronic payment with a particular invoice.

17. The non-transitory machine-readable medium of claim 16, wherein the automatic reconciliation comprises:
    determining whether a total value of the electronic payment matches an invoice associated with a customer associated with the particular VBAN; and
    generating an exception if the total value of the electronic payment does not match any invoice associated with a customer associated with the particular VBAN.

18. The non-transitory machine-readable medium of claim 17, wherein the automatic reconciliation further comprises:
    handling the exception by determining if the electronic payment constitutes an overpayment, underpayment, botched installment payment, or check-specific payment.

19. The non-transitory machine-readable medium of claim 18, wherein if it is determined that the electronic payment constitutes an underpayment, automatically forgiving a difference between the total value of the electronic payment and a total amount owed on a matching invoice if the difference is within a forgiveness threshold.

20. The non-transitory machine-readable medium of claim 19, wherein the forgiveness threshold is dynamically determined based on output of a machine learned model trained by a machine learning algorithm based on customer information, past customer payment information, and merchant information.

\* \* \* \* \*